United States Patent
Reyes

[11] Patent Number: 6,159,512
[45] Date of Patent: Dec. 12, 2000

[54] PRESERVATION OF EXPOSED CUT FRESH FRUIT

[75] Inventor: Vicente Geronimo Reyes, Werribee, Australia

[73] Assignee: Australian Food Industry Science Centre, Werribee, Australia

[21] Appl. No.: 09/091,562

[22] PCT Filed: Dec. 20, 1996

[86] PCT No.: PCT/AU96/00824

§ 371 Date: Jun. 22, 1998

§ 102(e) Date: Jun. 22, 1998

[87] PCT Pub. No.: WO97/23138

PCT Pub. Date: Jul. 3, 1997

[30] Foreign Application Priority Data

Dec. 21, 1995 [AU] Australia .................. PN7258/95

[51] Int. Cl.⁷ .................................................. A23B 7/16
[52] U.S. Cl. ........................ 426/102; 426/541; 426/615
[58] Field of Search ........................... 426/102, 541, 426/575, 615

[56] References Cited

U.S. PATENT DOCUMENTS

| | | | |
|---|---|---|---|
| 3,352,691 | 11/1967 | Li et al. | 426/52 |
| 3,754,938 | 8/1973 | Ponting | 426/321 |
| 3,991,218 | 11/1976 | Earle et al. | 426/250 |
| 4,011,348 | 3/1977 | Farrier et al. | 426/268 |
| 4,883,674 | 11/1989 | Fan | 426/118 |
| 4,895,729 | 1/1990 | Powrie et al. | 426/316 |
| 4,959,230 | 9/1990 | Wyss et al. | 426/102 |
| 4,988,522 | 1/1991 | Warren | 426/268 |
| 5,198,254 | 3/1993 | Nisperos-Carriedo et al. | 426/102 |
| 5,362,505 | 11/1994 | Hsieh et al. | 426/93 |
| 5,376,391 | 12/1994 | Nisperos-Carriedo et al. | 426/102 |
| 5,385,741 | 1/1995 | Rinn et al. | 426/13 |

FOREIGN PATENT DOCUMENTS

| | | | |
|---|---|---|---|
| 112655 | 12/1990 | Japan. | |
| 088363 | 11/1995 | Japan. | |
| 91/05479 | 5/1991 | WIPO | A23B 7/16 |
| 91/15959 | 10/1991 | WIPO | A23B 7/00 |
| 94/12041 | 6/1994 | WIPO | A23B 7/154 |
| 96/01560 | 1/1996 | WIPO | A01N 37/46 |

*Primary Examiner*—Milton Cano
*Assistant Examiner*—Sherry A. Dauerman
*Attorney, Agent, or Firm*—Pollock, Vande Sande & Amernick

[57] ABSTRACT

A package of exposed fresh fruit including cut pieces of fruit, a packaging material and an edible gel. The packaging material encloses the fruit and allows transmission of oxygen and carbon dioxide to maintain an atmosphere about the fruit of at least 2% oxygen. The edible gel coats exposed surfaces of the fruit. The gel coating includes an anti-oxidant to retard browning and sufficient acidic constituents to establish and maintain on the exposed surfaces of the fruit a pH below 3.

13 Claims, 2 Drawing Sheets

PRESERVATION OF EXPOSED CUT FRESH FRUIT

This is a 371 of PCT/AU96/00824 filed Dec. 20, 1996

FIELD OF THE INVENTION

The present invention generally relates to a method and a composition for preserving exposed fresh fruit and is particularly directed to a method and a composition for preventing enzymatic browning, microbial spoilage, reducing deterioration and/or extending the shelf life of peeled, damaged, cut or segmented fresh fruit pieces intended for chilled storage, distribution, marketing or further processing.

BACKGROUND TO THE INVENTION

Fresh cut and segmented fruit pieces have traditionally been marketed for further processing or manufacturing (e.g., pie filling or canning). It has more recently become popular for restaurants, fast-food establishments and institutions such as hospitals, prisons and the army to purchase fresh chilled "ready-to-use" fruit and vegetables to reduce labor costs and facilitate portion control in their operations. Some supermarkets are now providing salad bars where customers can prepare their own salads from freshly cut fruit and vegetables. However, fruit salad ingredients such as fresh cut and segmented apple, pear, nashi and banana pieces will show physical signs of deterioration, particularly enzymatic browning and microbial spoilage in a fairly short period of time (i.e. 1–3 days). Retail marketing of prepacked cut and segmented fresh fruit pieces could increase in the future provided the shelf life of this fruit can be extended beyond 7 days. An opportunity also exists in exporting fresh chilled fruit pieces if the shelf life could be at least 7 days under chilled or refrigerated conditions (1–6° C.).

As browning is an oxidative reaction it can be retarded by the elimination or reduction of oxygen from the cut surface of the fruit. However, browning will still occur when oxygen is reintroduced. Most of the currently available methods or compositions for inhibiting discolouration in fresh cut fruit pieces are used in conjunction with vacuum packaging, gas packaging or other similar techniques. AU 607200 describes a process based on gas packaging fresh fruit pieces in a high gas barrier container with a gas mixture containing carbon dioxide, oxygen and other inert gases such as helium, argon and hydrogen. This process has various limitations including reliance on package integrity, fermentation of the product under temperature abuse conditions and the high costs of gas packaging equipment and packaging materials.

Reduction of oxygen is possible by treating fresh uncut fruit with surfactants as described in EP 0275710. This process has limited application to fresh cut fruit pieces because the oxygen barrier may only be temporary. The use of surfactants in fresh cut fruits are not permitted by food regulatory bodies in most countries.

A more popular approach for the prevention of browning in fresh cut and segmented fruit and vegetables has been the use of antibrowning agents. Antibrowning agents are compounds that either act primarily on enzymes or the substrates and/or products of enzymatic catalysis in a manner which inhibits pigment formation. Antibrowning agents which have been previously disclosed for use in preventing color deterioration include ascorbic and other edible acids, sodium phosphates, sodium ascorbate, potassium ascorbate and sulphites.

The most widespread methodology used to control browning in fresh cut fruit and vegetables is the addition of sulphites. Although sulphites are very effective in the inhibition of enzymatic browning reactions, there are several negative attributes associated with their use in food. Sulphites are known to cause adverse health effects, especially in certain sensitive individuals such as asthmatics. Sulphites can also give negative effects on the taste of food. In the United States of America, the Food and Drug Administration (FDA) has banned sulphites for use in fresh salad bars. The use of sulphites in Australia is currently permitted only on fresh cut and segmented fruit pieces intended for manufacturing or further processing. However, more manufacturers and processors are now giving preference to fresh fruit pieces that have not been treated with sulphites.

Treatment compositions especially those containing sulphites are often used in conjunction with vacuum packaging using impermeable or high gas barrier packaging materials. Vacuum packaging generally creates anaerobic conditions which are conducive to anaerobic fermentation which can produce off flavors and promote the growth of pathogenic organisms. A preservative method or composition for extending the shelf life of fresh cut fruit pieces which does not rely on vacuum packaging would be of significant benefit to the fresh fruit industry.

The presence of oxygen in a package or container of cut and segmented fruit pieces is essential to reduce the risk of anaerobic food pathogen growth and avoids fermentation of the fruit pieces due to the lack of oxygen supply. Fresh cut and segmented fruit pieces are biologically and physiologically active in that their tissues are living and respiring. Fresh cut fruit pieces require oxygen to continue their normal respiratory activity. The conventional approach to allowing respiration but retard browning is to either encapsulate or coat the cut fruits or treat the cut surfaces with a solution containing anti browning agents, usually food acids.

U.S. Pat. No. 3,754,938 describes the use of an ascorbic acid-based composition containing 0.5 to 1% ascorbic acid, 0.05 to 0.1% calcium chloride and bicarbonate thereby maintaining a pH between 7 and 9 for the preservation of apple slices. U.S. Pat. No. 4,818,549 also discloses the use of an ascorbic acid, citric acid and calcium chloride composition. These compositions have limited effectiveness, as the concentration of antibrowning agents which remains on the entire surface of the fruit pieces is not sufficient.

U.S. Pat. No. 4,975,293 discloses the use of cyclodextrins and cyclic oligosaccharides as inhibitors of enzymatic browning for raw fruit and vegetable juices. Compositions containing cyclodextrins in combination with known antibrowning agents such as anti-oxidants and chelating agents are also described in U.S. Pat. No. 4,975,293. The use of such compositions has limited applications because cyclodextrins are not food approved.

WO) 91/02230 describes a technique of immersing fresh cut fruit and vegetables in an aqueous solution containing anions such as phosphate, pyrophosphate sulfate or chloride. The treated produce is then rinsed to remove the aqueous solution which could give a bitter undesirable taste. Fruit treated in this manner generally requires vacuum packaging because the effectiveness of the solution is limited to a short period of time.

The aforementioned preservative compositions which are in the form of aqueous solutions are also generally limited in effectiveness because of their inability to adhere on the sensitive cut surfaces of the fruit pieces. In order to overcome this limitation, EP 366,245 discloses a composition containing ascorbic acid and a thixotropic gum such as xantham, guar or tragacath for use in reducing the browning of fruit used in salad bars and prepared salads sold in fast food restaurants. However, this composition suffers from the disadvantages of having a slippery or slimy texture and limited adherence on the cut surfaces because the composition is an aqueous solution of high viscosity. It may be acceptable for salads which are covered in fruit juice but not for cut fruit intended to be eaten with the fingers rather than a spoon.

U.S. Pat. No. 4,504,504 discloses a sodium alginate coating which is firmed with a solution containing calcium chloride and preferably citric acid to be used on cut fruit and vegetables [particularly tomatoes] to inhibit loss of their flavor and texture during cooking.

U.S. Pat. No. 4837037 suggests treating coleslaw salad with a mixture of alginic acid and acetic acid to inhibit micro-organism growth and extend the shelf life of the coleslaw. This patent also suggests adding calcium ions to form an encapsulating coating.

A requirement accordingly exists for a preservation method and/or composition which does not contain sulphites nor use vacuum packaging, but which can be used to extend the shelf life of fresh fruit pieces by preventing enzymatic browning and microbial spoilage. It would also be advantageous for the fruit pieces to be packaged in an environment containing some oxygen so that the normal respiratory activity of the fruit tissue can be maintained.

BRIEF DESCRIPTION OF THE INVENTION

To this end the present invention provides a package of exposed fresh fruit wherein the exposed surfaces of the fruit are coated with an edible gel containing sufficient anti-oxidant to inhibit browning, said gel coating establishing a pH below 3 on the surface of said fruit and optionally the material enclosing said fruit allows the transmission of oxygen and carbon dioxide said package maintaining an atmosphere about said fruit of at least 2% oxygen. Optionally other anti-browning agents may be included in the gel coating.

This invention predicated on the discovery that inhibition of browning and the preservation of cut fruit texture for extended periods requires the reduction of moisture loss, the allowance of respiration and the maintenance of anti-oxidants on the cut surfaces. To prevent microbial spoilage it was found that the gel coating should maintain a pH below 3 on the exposed fruit surface. The prior art has addressed some of these factors but not all in one package. The edible gel coating serves to inhibit moisture loss from the cut fruit and also to act as a carrier for the anti-oxidant and other agents. The atmosphere around the coated fruit is maintained by the semi-permeable material.

Semi-permeable packages or containers are a cheaper alternative technique to vacuum packaging and barrier packaging for reducing the availability of oxygen. Semi-permeable packages can produce gas environments with at least 2% oxygen for the natural respiration of fruit tissues. The level of oxygen as well as carbon dioxide is altered by the natural respiration (i.e., consumption of oxygen and generation of carbon dioxide) of the fruit pieces and the permeability of the package to oxygen and carbon dioxide.

The term "exposed fresh fruit" is used herein in its broadest sense and includes the tissue normally covered by the skin of the fruit which is exposed when the fruit is peeled, cut, segmented or otherwise exposed. The plant tissue is fresh or raw and is preferably in the form of cut or segmented pieces which have not been heat sterilised or blanched which is usually the case with prior art methods. Suitable examples of fruit include apples, apricots, avocado, bananas, blackberries, blueberries, cherries, cranberries, custard apples, dates, durian, figs, grapefruit, grapes, jack fruit, kiwi fruit, lychee, mandarins, mangosteen, mangoes, melons, nashi, nectarines, oranges, papaya or paw paw, passionfruit, peaches, pears, pineapple, plums, pomegranates, pomelo, raspberries, rhubarb, star fruit, strawberries, tamarillo and tangerines of any maturity.

The edible gel coating may be of any suitable known type provided it is capable of acting as a carrier to effectively expose the peeled, damaged, cut or segmented fruit to the antibrowning agent. Preferably the gel coating has good film-forming properties under moist and refrigerated conditions and a texture simulating the fruit itself. It is also preferable that the gel coating is firm and hard as opposed to viscous and/or spreadable compositions so that it adheres well to the exposed tissue and protects the fruit from damage during handling and distribution. In this sense the term gel has its usual meaning of being a semi-solid suspension or jelly of a colloidal solid dispersed in a liquid. This distiguishes the coating of this invention from many prior art coatings that are dry coatings and not wet as a gel is. The final pH of the gel coating is adjusted to be below 3.0 as most enzymes and spoilage micro-organisms are inactivated under these conditions. Preferred edible gel coatings are polysaccharide gel forming gums, such as, alginate or derivatives thereof, for example, sodium alginate; gellan gum; modified starch; pectin substances, such as, pectin, for example, low-methoxy pectates; carrageenans, for example, kappa and iota carrageenans; or mixtures thereof. Preferably, the gel coating is sodium alginate, gellan gum or pectin.

The formation of the gel coating may be assisted by the use of food additives known in the art. Such food additives may include emulsifying, gelling, stabilising, thickening and firming agents. A particularly suitable food additive is a source of calcium ions as this is capable of reacting with alginates and other polysaccharides or derivatives thereof to form edible gels. The source of calcium ions may include calcium carbonate, sulphate, chloride, phosphate, lactate or tartrate. The rate of gel formation as well as the quality and texture of the resultant gel can be controlled by the solubility and availability of the calcium source. Calcium chloride is preferred as it is readily soluble in water and causes the instantaneous formation and precipitation of calcium alginate. As will be apparent hereinafter, calcium chloride is also effective as an antibrowning agent.

The anti-oxidants or reducing agents, are food grade compounds preferably selected from, ascorbic acid (Vitamin C) or derivatives or isomers thereof, for example, erythorbic acid. Other anti-browning agents which may be included in the gel coating include acidulants, such as, natural fruit juices or natural acids found on fruits, for example, citric, malic, fumaric, lactic, succinic, pyruvic, oxalacetic, quinic or tartaric acids or acid polysaccharides, for example, alginic acid or pectinic acid or derivatives or isomers thereof; chelating agents, such as, ethylenediaminetetraacetic acid (EDTA) or sodium acid pyrophosphate; phenolase inhibitors, such as, 4-hexylresorcinol; complexing agents, such as, chitosan; inorganic salts, such as, calcium salts, for example, calcium carbonate, sulphate, chloride, phosphate or tartrate; enzymes; and mixtures thereof.

A preferred combination of antibrowning agents suitable for use in the method of the invention is an antioxidant or reducing agent, such as, ascorbic or erythorbic acid; an acidulant to lower the pH, such as, citric acid or derivatives or isomers thereof; and calcium chloride.

Ascorbic acid and its isomer, erythorbic acid, have frequently been used interchangeably as anti-oxidants in the food industry. Their function in food systems is to act as free radical scavengers and thereby prevent oxidation, alter the redox potential of the system and reduce undesirable oxidative products. The main role of ascorbic and erythorbic acid in the prevention of enzymatic browning is their ability to reduce the orthoquinones to colorless diphenols.

Citric acid which functions as an acidulant is believed to have a dual inhibitory effect on phenolase by reducing pH and chelating copper at the enzyme-active site. The optimum pH of phenolase activity varies with the source of the enzyme and the particular substrate, but generally it has an optimum pH in the range of 6 to 7. Phenolase preparations from several sources are reported to be inactivated below pH 4.0. Hence, the role of an acidulant is to maintain the pH well below that necessary for optimal catalytic activity.

Calcium chloride performs the dual function of acting as both an antibrowning and a gelling or firming agent. The inhibition by chloride is pH dependent and increases as the pH is reduced, with the maximum inhibition being in the pH range of 3.5 to 5.0. The pH effect on the inhibition by chloride may be explained by the interaction between the negatively charged inhibitor and a positively charged imidazole group at the active site of phenolase. The use of calcium chloride has the added advantage of maintaining the firmness of the tissue by interacting with pectin in the cell walls of the fruit and acting as a gelling or firming agent for the gel coating, in particular sodium alginate.

In a preferred embodiment, the gel coating is sodium alginate and/or pectin and the antibrowning agents are ascorbic or erythorbic acid, citric acid and calcium chloride which also functions as a gelling or firming agent for the fruit tissues.

It will be appreciated that other conventional food additives such as natural fruit juices, artificial or natural flavorings, flavor enhancers, aromas, colorings, vitamins and bulk filling agents, for example, maltodextrins may be incorporated into the gel coating. Preferably the natural fruit juices, flavorings, flavorenhancers, aromas or colorings are derived from the fruit being preserved.

The choice of gel coating will depend on the ultimate consumer. Some may prefer a coating which has a soft texture, while others may prefer a firm coating with a texture similar to the fruit. Preferably, the coating is at least about 0.3 mm thick as the coating will become thinner over the storage time.

The concentration of edible gel coating and antibrowning agents used are preferably kept to a minimum. In one embodiment, about 1 to about 5% (w/v) sodium alginate and/or about 1 to about 5% (w/v) pectin are used as the edible gel coating and about 0.5 to about 4% (w/v) ascorbic acid or erythorbic acid, about 0.1 to about 2% (w/v) citric acid and about 0.5 to about 2% {w/v} calcium chloride are used as antibrowning agents. It will be appreciated that the final edible gel coating composition can be formulated using various combinations of ingredients.

According to a further aspect of the present invention there is provided a method for preserving exposed fresh fruit which comprises the steps of:

(a) applying an edible gel coating to the exposed fruit;
(b) applying to the gel coating a firming agent so that the gel coating adheres evenly to the surface and an antioxidant so that browning of the fruit surface is inhibited and ensuring that the gel coating maintains a pH below 3 on the exposed fruit surface; and
(c) optionally storing the coated exposed fruit in a semipermeable package so that the atmosphere around the fruit contains at least 2% oxygen.

The gel coating may be prepared using any suitable known technique. For example, the gel coating may be formed instantaneously by reacting calcium with sodium alginate and/or low-methoxy pectates. This could be achieved using a "wet sodium alginate and/or low-methoxy process" in which a setting bath containing calcium ions also contains sufficient ascorbic acid and citric acid to give a final gel coating preferably having a pH of less than about 3.0. A typical composition for forming the gel coating in the wet process may contain the following ingredients in amounts expressed as percentages by weight of the total volume of solvent which is usually water:

(a) gel coating : sodium alginate and/or pectin: 1.0–5.0% (w/v)
(b) setting bath : ascorbic acid: 0.5–4.0% (w/v) citric acid: 0.1–2.0% (w/v) calcium chloride: 0.5–2.0% (w/v)

Other polysaccharide gums, such as, gellan gum can also be used to form the gel coating instead of sodium alginate or pectin. However, the texture of the gel is not as firm when gellan gum is used. The amount of polysaccharide gum required to form the gel coating would depend on the preferred softness or firmness of the gel. Typically, about 1 to about 5% (w/v) of vegetable gum would give an acceptable texture for direct consumption. Other firming or gelling agents such as calcium lactate can also be used to form the gel coating.

Alternatively, the gel coating could be formed using a "dry process" provided that the final composition of the coating with respect to the amount of gel coating, antioxidant, acidulant and calcium source approximates the gel composition formed by the wet process. The dry process may involve initial application of an aqueous dispersion containing polysaccharide gum to the surface of the fruit, followed by the application of a dry gelling mixture on the surface of the polysaccharide coated fruit for a period of time sufficient to form a substantially continuous film along the surface of the fruit.

The gel coating, antibrowning agents and the other optional food additives may be applied to the cut and segmented fruit pieces sequentially or separately by any suitable technique, such as, for example, by immersing the fruit pieces in aqueous solutions of the coating, antibrowning agents and optional food additives or by curtain coating or spraying. The edible coating is generally applied before the antibrowning agent so that the gel coating can adhere to the fruit. Furthermore, the antibrowning agent usually contains calcium or other gelling agents for instant gelling of the coating. The exposure time during coating would depend on a variety of factors and preferably enables the coating to encapsulate the entire surface of the exposed fruit.

The preserved fresh fruit of the present invention is advantageously stored in a package so as to maintain the aerobic conditions i.e. 2–10% oxygen) required for regular but low respiratory activity of the fruit. Anaerobic conditions (i.e. <2% oxygen) or the absence of oxygen could result in anaerobic fermentation leading to off flavor development and/or facilitate the growth of toxin production by micro-organisms, such as, for example, Clostridium botulinum at storage temperatures above 4° C.

The term "epackage" is used herein in its broadest sense and includes any means for containing the exposed fresh fruit, such as, for example, a parcel, film, container, box or bag. The package may be unsealed or sealed, such as, for example, by vacuum or heat sealing with or without modification of the package headspace.

The package is semi-permeable to oxygen and carbon dioxide so an equilibrium concentration of both gases is established when the rate of gas transmission through the package is equal to the rate of respiration (hereinafter referred to as an "equilibrium-modified atmosphere"). The equilibrium-modified atmosphere in the semi-permeable package will depend on various parameters including rate of fruit respiration, fill weight, the gas permeability of the package and the surface area for gas exchange. Preferably, the equilibrium-modified atmosphere in the package is about 2 to about 10% oxygen and about 1 to about 10% carbon dioxide under refrigerated conditions.

The semi-permeable material from which the package is wholly or partly composed may be selected from a single or multi-layer polymeric film having an oxygen transmission rate (OTR) of about 2,400 to about 4,000 $cc/m^2$-day (2° C., 92% relative humidity). The OTR value at standard conditions (23° C. and 70% relative humidity) is about 4,000 to about 8,000 $cc/m^2$-day. Preferably, the semi-permeable material has an OTR value of about 7,000 $cc/m^2/day$ (23° C.).

Preferably, the preserved fruit and/or package containing the preserved fruit are stored at temperatures below about 1° C., preferably in the range of about −10° C. to about 4° C.

The present invention has the advantages of preventing enzymatic browning, microbial spoilage, reducing deterioration and/or extending the shelf life of peeled, damaged, cut, segmented or otherwise exposed fruit. These advantages are achieved without the use of sulphites, thermal processing, cooking, freezing or vacuum packaging and in the absence of an appreciable loss of natural flavor, color and texture.

While not wishing to be bound by any theory, it is believed that the preservation of exposed fresh fruit by the method and composition of the present invention may depend (at least in part) on the following factors:

1. Ability of the edible gel coating to carry the antibrowning agents on all cut surfaces permanently.
2. Ability of the edible gel coating to have a pH of 3.0 or below.
3. Ability of the edible gel coating to reduce oxygen uptake leading to low but normal respiration and to reduce moisture loss of the fruit pieces that would otherwise lead to wilting of the product.
4. Ability of the gel coating composition to bind enzymes and spoilage micro-organisms at a low pH thereby inactivating them.
5. Ability of the semi-permeable packaging material to reduce and maintain the level of oxygen in the range of 2–10% which is desirable for maintaining low normal tissue respiration and reducing the availability of oxygen for enzymatic browning.
6. Maintenance of storage temperature in the range of about −1 to about 4° C. for optimum shelf life of the exposed fresh fruit.

DETAILED DESCRIPTION OF THE INVENTION

The invention will now be described with reference to the following Examples. These Examples are not to be construed as limiting the invention in any way.

Figure 1:
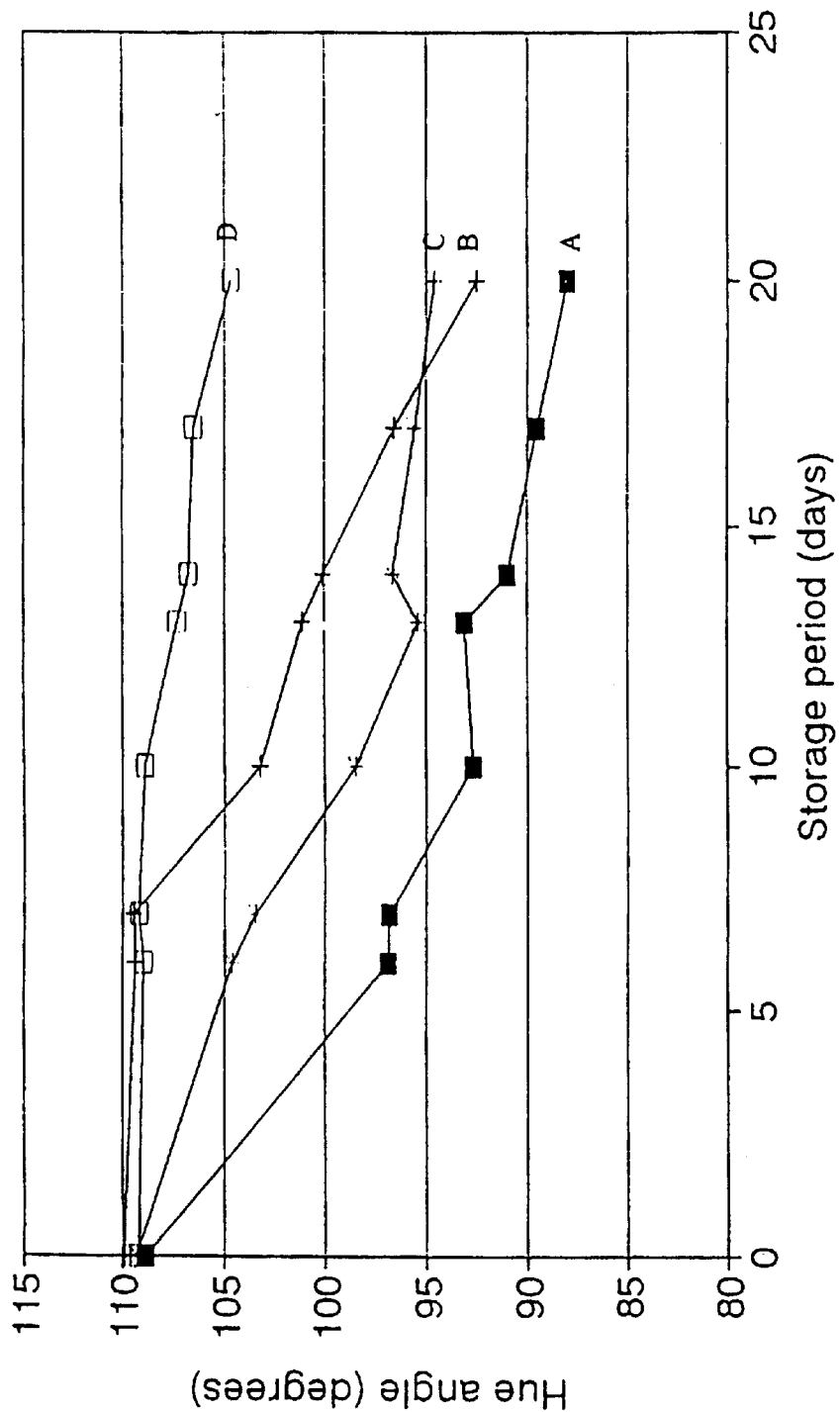
Figure 2:
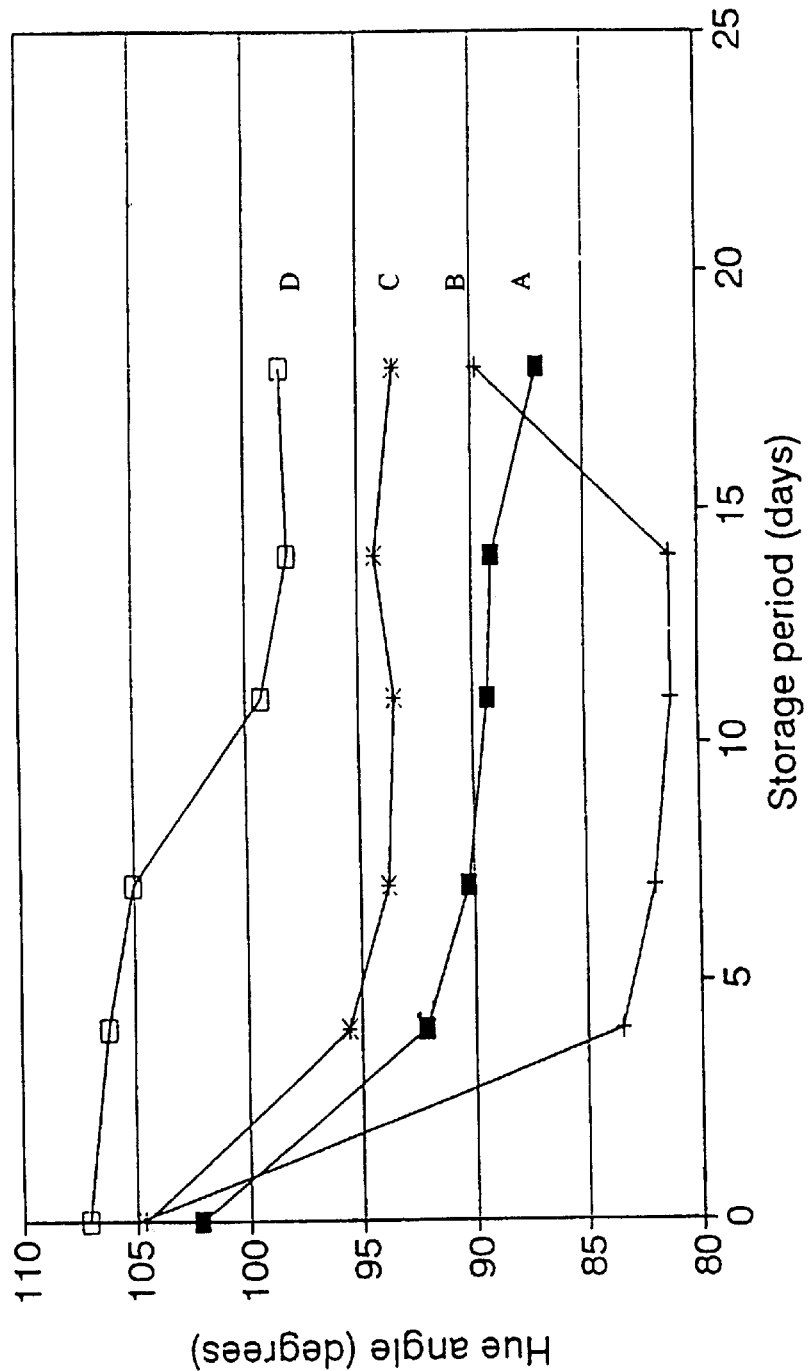

In the Examples, reference will be made to the accompanying drawings in which: FIG. 1. is a graphical representation. showing the change in the hue angle of apple pieces during a 20 day period of storage at 4° C. for Treatments A to D shown in Table 1.3; and FIG. 2 is a graphical representation showing the change in hue angle of pear pieces during a 20 day period of storage at 4° C. for Treatments A to D shown in Table 2.1

EXAMPLE 1

The object of this experiment was to determine the individual and combined effects of a selected mixture of antibrowning agents and sodium alginate gel coating in inhibiting enzymatic browning and/or extending the short shelf life of fresh cut apple pieces.

Apples (cv. Granny smith) stored for about 5 months at 1° C. were sliced longitudinally into quarters. The epidermis in each quarter or piece was peeled manually with a potato knife peeler. Core section was also removed using a knife. Since there were 4 treatments in this study as shown in Table 1.1 below, each quartered section coming from a whole apple was allotted for each treatment. The edible gel coating and antibrowning agents corresponding to treatments C (coating only) and D (coat and antibrowning agents) were applied in two stages: (i) Solution I contained 3% sodium alginate (w/v, Manucol DH Kelco); and (ii) Solution II was a combination of antibrowning agents (treatment D) or calcium chloride solution (treatment C). Each apple piece receiving the edible gel coating (treatments C and D) was immersed into Solution I for about 3 minutes and allowed to drip for about 20 seconds, followed by immersion into Solution II which resulted in a clear homogenous gel coating or encapsulation over the entire surface of the apple piece. It took about 15 minutes to complete the second immersion resulting in the formation of a firm gel with a pH close to that of Solution II which was about 2.2. After draining in a colander, 4 apple pieces were placed in a semi-permeable polyethylene blend plastic (OTR==7000$cc/m^2$/day;23° C., 70% RH); bag (140×170 mm) and heat sealed. Preliminary tests suggested that this packaging material would produce an equilibrium atmosphere in the range of 3–10oxygen.

Samples corresponding to treatment B were prepared by immersing the apple pieces directly in Solution II containing the antibrowning agents ascorbic and citric acid for about 3 minutes (Table 1.1). An additional treatment (A) which acted as a control was also prepared by dipping the apple pieces in water. All plastic bags containing the apple pieces were heat sealed prior to storage. Each treatment consisted of 3 replicate bags containing 4 apple pieces per bag. All samples were stored at 4° C. for about 20 days.

TABLE 1.1

Treatments used on fresh cut apple slices stored at 4°

| SOLUTION II | | SOLUTION I | |
|---|---|---|---|
| Ascorbic Acid (%) | Citric Acid (%) | Sodium Alginate (%) | TREATMENT |
| — | — | — | A |
| 1.0 | 0.25 | — | B |
| — | — | 3.0 | C* |
| 1.0 | 0.25 | 3.0 | D* |

*Solution II contained 1% calcium chloride to set the gel coating

Browning measurement. Treatment effectiveness was evaluated by measuring color changes at the peeled surface of treated samples and control during storage. To measure color objectively, the CIELAB's "L" (light-dark), "a" (red-green) and "b" (yellow-blue) for randomly selected surface areas were measured using a Minolta Chroma meter, Model CR300 with a 8 mm specimen port. To evaluate the change in color, hue angle was calculated from the tristimulus data (tan−1 b/a). Hue angle values of 0°, 90°, 180° and 270° indicate red, yellow, green and blue, respectively. Hue angle values close to 90° indicate more browning. Minolta readings were mainly taken on the sensitive core sections which limit the visual acceptability of the slices. Hue angle values are the average of 36 readings per treatment.

Visual scoring for browning. A subjective visual evaluation was also conducted to assess the change in color during storage.

A scoring system described in Table 1.2 below was used to subjetivectively assess the visual acceptability of fresh cut apple pieces. A color score of 11611 was considered marginally acceptable. End of shelf life corresponds to a visual score of 5

TABLE 1.2

Visual Scoring System for Fresh Apple Slices

| SCORE | Degree of browning |
|---|---|
| 10 | No browning, very fresh like |
| 9 | No browning, slight loss of natural color |
| 8 | Very slight browning, 1 brown spot - diameter <5 mm |
| 7 | about 2 brown spots - diameter less than 5 mm |
| 6 | about 1/3 worst section browned (core, inner & peel side) |
| 5 | 1/3 to 2/3 of the worst section browned |
| 3 | 2/3 to 3/4 of the whole section browned |
| 2 | >3/4 of the whole piece browned |

Results and Discussion

Table 1.3 below summarises the visual scores and general acceptability of fresh cut apple samples subjected to various treatments. FIG. 1 shows the changes in hue angle values in various treatments during the 20 day period of storage of apple slices at 4° C. Previous tests have shown that hue angle is a good indicator of enzymatic browning on the apple slices. Generally, a 7° reduction in the original value of the hue angle is considered unacceptable in Granny Smith apples used in this example. Since the initial hue angle in this study was about 110°, a sample with a hue angle of less than 103° can be considered unacceptable.

TABLE 1.3

Visual observations on fresh cut apple pieces

| Treatment | storage days | Visual score | General Acceptability |
|---|---|---|---|
| A: | 0 | 10 | Acceptable |
| Water-dipped | 6 | 5 | Unacceptable |
|  | 7 | 5 | Unacceptable |
|  | 10 | 4 | Unacceptable, also dry appearance |
|  | 13 | 4 | Unacceptable, also dry appearance |
|  | 14 | 3 | Unacceptable, also dry appearance |
|  | 18 | 3 | Unacceptable, yeasts growth |
|  | 20 | 3 | Unacceptable |
| Antibrowning | 0 | 10 | Acceptable |
| solution | 6 | 8 | Acceptable |
|  | 7 | 8 | Acceptable |
|  | 10 | 5 | Unacceptable, core browned |
|  | 13 | 5 | Unacceptable, core browned |
|  | 14 | 4 | Unacceptable |
|  | 18 | 3 | Unacceptable, yeasts growth |
|  | 20 | 3 | Unacceptable |
| Coat only | 0 | 10 | Acceptable |
|  | 6 | 6 | Acceptable |
|  | 7 | 6 | Acceptable |
|  | 10 | 5 | Unacceptable, most sections browned |

TABLE 1.3-continued

Visual observations on fresh cut apple pieces

| Treatment | storage days | Visual score | General Acceptability |
|---|---|---|---|
|  | 13 | 4 | Unacceptable, also yeasts growth |
|  | 14 | 4 | Unacceptable |
|  | 18 | 3 | Unacceptable |
|  | 20 | 3 | Unacceptable |
| D: | 0 | 10 | Acceptable |
| Coat & | 6 | 10 | Acceptable |
| Antibrowning | 7 | 9 | Acceptable |
| solution | 10 | 9 | Acceptable |
|  | 13 | 9 | Acceptable |
|  | 14 | 9 | Acceptable |
|  | 18 | 6 | Acceptable, browning on center core |
|  | 20 | 6 | Unacceptable, due to yeasts growth and degree of browning |

Both hue angle values and visual scores declined during storage as a direct result of enzymatic browning of apple slices mainly on the cored section (Table 1.3 and FIG. 1). Hue angle values show that the combination of sodium alginate gel coating and antibrowning agents gave the most inhibition against browning during the entire duration of the storage trial. The onset of browning as indicated by the decline in hue angle values was delayed up to 14 days in the developed combination of antibrowning agents and edible gel coating. The onset of browning on other samples were about 10 days in treatment B (antibrowning; solution only), 6 days in treatment C (coating only) and less than 6 days in water dipped samples. Shelf life values based on a 7° reduction in hue angle are listed in Table 1.4 below. The following are the shelf life values based on hue angle: water-dipped (treatment A)—3 days, antibrowning solution only (treatment B)10 days, coating only (treatment C)—7 days and gel coating and antibrowning agents combined (treatment D)—20 days. Measurements were terminated on the 20th day of storage because of the visual presence of yeast growth.

Visual scores followed a similar trend to that of hue angle values (Table 1.3). Shelf life values using a subjective visual scoring focussed mainly on browning gave the following shelf life values: water-dipped (treatment A)—2 days, solution only (treatment B)—7 days, coating only (treatment C)—7 to 9 days and coating and antibrowning combined (treatment D)—20 days. An inspection for general appearance revealed that the samples treated with the combination of gel coating and antibrowning agents exhibited some signs of yeast colonies on the surface of the apple pieces. In consideration of the presence of yeast colonies on those samples, the shelf life of D samples should be about 18 days. The shell life of 18 days is considered to be a very significant improvement since this was accomplished under an aerobic condition of about 7–9% oxygen (equilibrium condition).

Table 1.4 summarizes the surface pH of the apple segments subjected to various treatments. Among the treatments used in this example, only the combination of the gel coating and antibrowning solution (D) was able to maintain the surface pH of the segments below 4.0 up to at least 8 days. Treatment D was also able to bring down the surface pH of the apple segments below 2.5 which would be sufficient to inactivate enzymes reponsible for browning and inhibit microbial growth.

This example illustrates the potential of combining edible gel coating and antibrowning agents in conjunction with semi-permeable packaging and low temperature storage.

The individual fruit pieces can be treated with specific ingredients and packaging material and stored at optimum temperatures (i.e. −1 to 4° C. maximise the quality of each individual frit pieces or mixtures of various fruit pieces.

TABLE 1.4

Surface pH of apple segments during storage at 4° C.

| Treatment | Storage Days | Average | Standard Variation |
|---|---|---|---|
| A. Water-dipped | 0 | 4.01 | 0.13 |
| | 8 | 5.78 | 0.27 |
| | 14 | 5.04 | 0.24 |
| | 21 | not measured | — |
| B. Antibrowning solution | 0 | 2.96 | 0.07 |
| | 8 | 5.08 | 0.12 |
| | 14 | 4.81 | 0.33 |
| | 21 | not measured | — |
| C. Coat only | 0 | 4.08 | 0.22 |
| | 8 | 6.30 | 0.21 |
| | 14 | 5.96 | 0.47 |
| | 21 | not measured | — |
| D. Coat & Antibrowning solution | 0 | 2.49 | 0.23 |
| | 8 | 3.80 | 0.21 |
| | 14 | 4.60 | 0.15 |
| | 21 | 4.39 | 0.32 |

TABLE 1.5

Summary of shelf life values of fresh cut apple pieces stored at 4° C.

| Treatment | Shelf life based on hue angle (days) | shelf life based on visual observation (days) |
|---|---|---|
| A: Water-dipped | 3 | 2 |
| B: Antibrowning solution | 10 | 7–9 |
| C: Coating only | 7 | 7 |
| D: Coat & antibrowning solution | 20 | 18 |

EXAMPLE 2

The object of this Experiment was to determine the individual and combined effects of a selected mixture of antibrowning agents and sodium alginate gel coating in inhibiting enzymatic browning and/or extending the short shelf life of fresh cut pear pieces.

Trials were carried out using pears (Packham). These pear fruits had been stored for about 5 months. Samples were prepared and subjected to the same procedures described in Example 1.

Minolta measurements were made on the peel section of the quartered pieces instead on the core section because the peel section was found to brown faster than the core section.

Results and Discussion

Table 2.1 below summarizes the visual scores and general acceptability of fresh cut pear samples subjected to various treatments. FIG. 2 shows the changes in hue angle values in various treatments during the duration of the storage test. For fresh cut pear pieces used in this example, a reduction of more than 8° from the original value of the hue angle is considered unacceptable. Since the initial hue angle in this study was about 107° (treatment D), a sample with a hue angle of less than 99° can be considered unacceptable. Similarly samples of treatment A (water-dipped) with an initial hue angle of about 102° were rated unacceptable when their hue angle values were less than 94°

TABLE 2.1

Visual observations on fresh cut Packham pear pieces

| Treatment | storage days | Visual score | General Acceptability |
|---|---|---|---|
| A: Water-dipped | 0 | 10 | Acceptable |
| | 4 | 4 | Unacceptable, browned on all sections |
| | 7 | 3 | Unacceptable, browned on all sections |
| | 11 | 3 | Unacceptable, browned on all sections |
| | 14 | 2 | Unacceptable, browned on all sections |
| | 18 | 2 | Unacceptable, browned on all sections |
| B: Antibrowning Solution | 0 | 10 | Acceptable |
| | 4 | 4 | Unacceptable, browned on all sections |
| | 7 | 3 | Unacceptable, browned on all sections |
| | 11 | 3 | Unacceptable, browned on all sections |
| | 14 | 2 | unacceptable, browned on all sections |
| | 18 | 2 | Unacceptable |
| C: Coat only | 0 | 10 | Acceptable |
| | 4 | 4 | Unacceptable, better than A and B |
| | 7 | 4 | Unacceptable, better than A and B |
| | 11 | 4 | Unacceptable, browned on all sections |
| | 14 | 2 | Unacceptable, browned on all sections |
| | 18 | 2 | Unacceptable |
| D: Coat & antibrowning solution | 0 | 10 | Acceptable |
| | 4 | 9 | Acceptable |
| | 7 | 8 | Acceptable |
| | 11 | 7 | Acceptable |
| | 14 | 6 | Acceptable, browning on peel section |
| | 18 | 4 | Unacceptable, browned on most sections |

Both hue angle values and visual scores declined during storage as a direct result of enzymatic browning on various sections of the pear quartered piece (table 2.2 and FIG. 2). Browning in these pear samples were more pronounced on the peel section. The rate of browning and general deterioration in these pear samples were found to be faster compared to the apple pieces of example 1. This could be due to the higher production of ethylene gas (ripening gas) by pear fruits compared to apples whether they are fresh cut or whole and unprocessed. Another reason could be the quality of the pears used in this study which were close to being fully ripened.

Hue angle values clearly show that the combination of sodium alginate gel coating and antibrowning solution on the fruit pieces gave the most inhibition against browning. Shelf life values based on an 8 degree reduction in hue angle are listed in Table 2.2. The following are the shelf life values based on hue angle: water-dipped( treatment A)—about 2–3 days, antibrowning solution only (treatment B)—1 day, coating only (treatment C)—3 days and gel coating and antibrowning agents combined (treatment D) 14 days. In this example, the use of antibrowning solution accelerated the rate of browning in pear samples in contrast to those observed in apple pieces. This is probably due to the fact that the use of insufficient concentration of antibrowning agents accelerates enzymatic reactions in some products. However, the combination of the edible gel coating with the anti-browning solution did not result in any acceleration in browning (treatment D, FIG. 2).

Visual scores followed a similar trend to that of hue angle values (Table 2.2). Shelf life values using a subjective visual scoring focussed mainly on browning gave the following shelf life values: water-dipped (treatment A)—2 days, solution only (treatment B)—2 days, coating only (treatment C)—2 days and coating and antibrowning combined (treatment D)—14 days. The shelf life of 14 days achieved in this combination is considered to be a very significant improvement since this was accomplished under an aerobic condition of about 9% oxygen and 3% carbon dioxide (equilibrium condition) which would maintain the natural respiration of the fruit tissues.

TABLE 2.2

Surface pH of pear segments during storage at 4° C.

| Treatment | Storage Days | Average |
|---|---|---|
| A: Water dipped | 0 | 6.3 |
|  | 7 | 6.36 |
|  | 14 | 6.26 |
|  | 18 | not measured |
| B: Antibrowning solution | 0 | 2.85 |
|  | 7 | 4.42 |
|  | 14 | 5.05 |
|  | 18 | not measured |
| C: Coat only | 0 | 4.1 |
|  | 7 | 6.17 |
|  | 14 | 4.04 |
|  | 18 | not measured |
| D: Coat & Antibrowning solution | 0 | 2.37 |
|  | 7 | 3.18 |
|  | 14 | 3.48 |
|  | 18 | 3.34 |

Table 2.2 summarizes the surface pH of the pear segments subjected to various treatments. Treatment D which was the combination of gel coating and antibrowning solution reduced the surface pH from 6.3 (water dipped) to 2.4. The surface ph of Treatment D samples were also effectively maintained below 3.5 during the entire duration of the storage test. The reduction and maintenance of surface pH below 3.5 in conjunction with the use of anti-oxidants (ascorbic acid) prevented the development of enzymatic browning as evidenced by hue angle values and visual observations.

This example illustrates the successful extension of shelf life of fresh cut pear pieces using the developed preservation system.

TABLE 2.3

Summary of shelf life values of fresh cut pear pieces stored at 4° C.

| Treatment | Shelf life based on Hue angle (days) | Shelf life based on visual observation (days) |
|---|---|---|
| A: Water-dipped | 2–3 | 2 |
| B: Anti browning solution | 1 | 2 |
| C: Coating only | 3 | 2 |
| D: Coat & antibrowning solution | 14 | 14 |

EXAMPLE 3

In this example packaging materials of different permeabilities were tested and compared.

In all cases apples were peeled and segmented and then coated with sodium alginate as set out in the previous examples and one sample was water dipped only. The sodium alginate coated samples were infused with calcium chloride, ascorbic acid and citric acid.

One set of the coated apple segments (A) and the water dipped (E) segments were sealed in a film of 50 micron polyethylene blend having an OTR of 7000ccc/m$^2$/day; 23° C.

In sample (B) a set of the coated apple segments were placed in an unsealed bag.

In sample (C) the coated apple segments were sealed in a 32 micron polyester having an OTR of 3700cc/m$^2$/day; 23° C.

In sample (D) the coated apple segments were stored in a sealed barrier film having an OTR of 20cc/m$^2$/day; 23° C.

TABLE 3.1

Shelf life of apple segments in various packaging materials

| Treatment | Shelf life based on sensory observation (days |
|---|---|
| A | >16 days* |
| B | 8 days |
| C | >16 days* |
| D | 8days -fermented flavor & odor |
| E | 0 day |

*test terminated at day 16

This experiment demonstrates the effectiveness of the preferred coating regardless of the packaging material. For maximum shelf life a sealed permeable film gives the best results. Overall results suggest that treatment A which uses a packaging film with an OTR about 7,000 gave the best product.

EXAMPLE 4

In this example variations in the infusion of the alginate coating were compared. Except for the water dipped sample (A) all the apple segments were coated in sodium alginate. All samples were stored in a sealed film of 50micron polyethylene (OTR 7000cc/m$^2$/day; 23° C.).

(A) Apple segments were coated with sodium alginate as in example 1 and then treated with a solution of calcium chloride (1% w/v), ascorbic acid (1.5% w/v) and citric acid (0.37).

(B) Apple segments coated with sodium alginate were infused with calcium chloride (1% w/v) and citric acid [0.37% w/v] (no ascorbic acid).

(C) Apple segments coated with sodium alginate were infused with Calcium chloride (1% w/v) and ascorbic acid (1.5% w/v) (no Citric Acid)

(D) Apple segments were dipped in a solution of Ascorbic acid and then coated with sodium alginate and subsequently dipped in a solution of calcium chloride (1% w/v) and citric acid (0.37% w/v).

(E) Apple segments were water dipped and stored in a sealed pack.

TABLE 4.1

Shelf life of apple segments treated by various methods

| Treatment | Shelf life (days) |
|---|---|
| A | >16days* |
| B | 6 days |
| C | >16days* |
| D | 5 days |
| E | 0 day |

*test terminated on day 16

This experiment shows that the presence of ascorbic acid in the coating is critical to achieving commercially acceptable shelf life. The results of this example also indicate that the usual treatment of dipping in ascorbic acid [treatment D] prior to encapsulation/coating is not as effective as its incorporation in the gel coating (treatment A and C).

EXAMPLE 5

In this example coatings other than alginate were tested. In all cases the treated apple segments were stored in sealed films of 50 micron polyethylene blend (OTR 7000cc/m$^2$/day; 23° C.). Coating and infusion were conducted as described in example 1.

(A) apple segments were coated with sodium alginate (3% manugel GHB, Kelco) and the coating infused with calcium chloride (1% w/v), ascorbic acid (1.5% w/v) and citric acid (0.37% w/v).

(B) apple segments were coated with pectin(low methoxy, Mexpectin LC910, Grinsted) which was then infused with the same concentrations of calcium chloride ascorbic acid and citric acid as in treatment A.

(C) apple segments were coated with carrageenan (35 w/v, iota carrageenan, Sigma chemical Co) and then the coating was infused with the same concentrations of calcium chloride Ascorbic acid and citric acid as in treatment A.

(D) apple segments were only water dipped.

The alginate, pectin, and carrageenan coating samples were prepared as described in example 1. Carrageenan was applied at about 60° C.

TABLE 5.1

Shelf life of apple segments with various coatings*

| Treatment | Shelf life (days |
|---|---|
| A | >16 days |
| B | >16 days |
| C | >16 days |
| D | 0 day |

*test terminated at day 16

This experiment illustrates that any gel forming edible polysaccharide coating will be suitable as a carrier for the anti browning agents and maintenance of low surface pH of the product.

EXAMPLE 6

Mixtures of fruits were tested with various treatments described in example 4. In all cases the fruits comprised peeled and segmented (⅛) apple [50%] and honeydew melon balls 20 mm diameter (50%)

(A) The mixed fruit segments were coated with sodium alginate and then treated with a solution of Calcium chloride, Ascorbic acid and Citric acid.

(B) The mixed fruit segments coated with sodium alginate were infused with calcium chloride and Citric acid (no Ascorbic acid).

(C) The mixed fruit segments coated with sodium alginate were infused with Calcium chloride and ascorbic acid (no Citric Acid).

(D) The mixed fruit segments were dipped in a solution of calcium chloride and citric acid and subsequently coated with sodium alginate.

(E) The mixed fruit segments were water dipped and stored in a sealed pack.

TABLE 6.1

Shelf life of mixed fruits subjected to various treatments

| Treatment | Shelf life based on sensory observation (days |
|---|---|
| A | >16 days* |
| B | 8 days |
| C | >16 days* |
| D | 8 days |
| E | 0 day |

*test terminated after day 16

This experiment shows that the coating works well with mixed fruits and again shows the importance of delivering ascorbic acid and acidulants onto the surface of the fruit

EXAMPLE 7

The effectiveness of controlling microbiological growth and moisture loss by the use of edible gel coating and antioxidants were evaluated in Valencia orange segments. The orange segments were prepared by cutting the orange perpendicular to its axis to about 10 mm thick followed by mechanical coring to remove the peel. Samples were divided into 2 groups and were either coated as described in example 1 (Treatment A) or dipped in water (Control). Solution A consisted of 3% alginate (Manugel GHB, Kelco) while the infusing solution B contained 1% ascorbic acid, 0.25% citric acid, and 1% calcium chloride (% w/v).

Results

This example shows that the coating of orange segments with antioxidants primarily ascorbic and citric acid could double the shelf life under refrigerated storage. Shelf life was extended by the use of edible coating due to the inhibition of microbiological growth (Table 7.1) and prevention of moisture loss.

TABLE 7.1

Summary of microbiological loads in orange segments stored at 4° C.

| Storage period | Total viable count (cfu/g) | | Yeasts and mould count (cfu/g) | |
|---|---|---|---|---|
| (days) | Control | Coated | Control | Coated |
| 0 | $2.0 \times 10^2$ | $2.0 \times 10^2$ | $2.0 \times 10^2$ | $2.0 \times 10^2$ |
| 6 | $6.1 \times 10^2$ | $1.9 \times 10^3$ | $8.8 \times 10^3$ | $1.7 \times 10^3$ |
| 13 | $1.0 \times 10^6$ | $1.5 \times 10^3$ | $5.7 \times 10^4$ | $1.8 \times 10^3$ |

TABLE 7.1-continued

Summary of microbiological loads in orange segments stored at 4° C.

| Storage period (days) | Total viable count (cfu/g) | | Yeasts and mould count (cfu/g) | |
|---|---|---|---|---|
| | Control | Coated | Control | Coated |
| 20 | $1.9 \times 10^7$ | $2.0 \times 10^4$ | $7.6 \times 10^4$ | $1.2 \times 10^5$ |
| 27 | not analyzed | $9.7 \times 10^4$ | not analyzed | $1.5 \times 10^5$ |

TABLE 7.2

Shelf life of orange segments stored at 4° C.

| Treatment | Shelf life (days) |
|---|---|
| Control (water dipped) | 13 |
| Coated | 27 |

EXAMPLE 8

In this example ascorbic acid was replaced by L-cysteine (hydrochloride monohydrate, Sigma Chemical Co.). In all cases the treated Granny Smith apple segments were coated and packaged as described in example 1. The gel coating used in this example used 3% (w/v) alginate (Manucol DH, Kelco) in solution of example 1.

(A) Infusing solution: 2% ascorbic acid, 0.5% citric acid and 1% calcium chloride
(B) Infusion solution: 0.5% L-cysteine, 0.5% citric acid and 1% calcium chloride
(C) Infusion solution: 1.0% L-cysteine, 0.5% citric acid and 1% calcium chloride
(D) Water dipped (Control)

Results

This example shows that the replacement of ascorbic acid with at least 0.5% L-cysteine could give a similar degree of prevention of enzymatic browning and shelf life extension in Granny Smith apple segments. Treatments containing ascorbic acid (treatment A), 0.5% L-cysteine (treatment B), and 1% L-cysteine (treatment C) were able to prevent enzymatic browning Up to 20 days at 4° C. (Table 8.1). However, the incorporation of L-cysteine instead of ascorbic acid gave some detectable off-flavor in all treated fruit segments.

TABLE 8.1

Shelf life of Granny Smith apple segments stored at 4° C.

| Treatment | Shelf life (days) |
|---|---|
| A: with 2% ascorbic acid | 20 |
| B: with 0.5% L-cysteine | 15–20 |
| C: with 1.0% L-cysteine | 20 |
| D: Control (water dipped) | 0 |

Throughout this specification, unless the context requires otherwise, the word "comprise", or variations such as "comprises" or "comprising", will be understood to imply the inclusion of a stated integer or group of integers but not the exclusion of any other integer or group of integers.

What is claimed is:

1. A package of exposed fresh fruit, comprising:
   cut pieces of fruit;
   a packaging material enclosing the fruit and allowing transmission of oxygen and carbon dioxide to maintain an atmosphere about the fruit of at least 2% oxygen; and
   an edible gel coating exposed surfaces of the fruit, the coating comprising an anti-oxidant to retard browning, the gel coating having sufficient acidic constituents to establish and maintain on the exposed surfaces of the fruit a pH below 3.

2. The package according to claim 1, wherein the coating further comprises an acidulant including a food grade acid to maintain the pH below 3 on the exposed surfaces of the fruit and to enhance the anti-browning activity of the coating.

3. The package according to claim 2, wherein the acidulant is citric acid.

4. The package according to claim 1, wherein the anti-oxidant includes at least one member selected from the group consisting of ascorbic acid and L-cysteine.

5. The package according to claim 1, wherein the coating further comprises a gel firming agent that enhances the anti-browning activity of the coating.

6. The package according to claim 5, wherein the firming agent comprises calcium chloride.

7. The package according to claim 1, wherein the edible gel further comprises a polysaccharide.

8. The package according to claim 7, wherein the polysaccharide is selected from alginate, pectin and carrageenan.

9. Exposed fresh fruit or a mixture of exposed fresh fruits, comprising:
   cut pieces of fruit; and
   an edible gel coating exposed surfaces of the fruit, the coating comprising a polysaccharide, a firming agent, and an anti-oxidant, the gel coating inhibiting browning on the exposed surfaces and having sufficient acid constituents to establish and maintain a pH below 3 on the exposed surfaces of the fruit.

10. Exposed fresh fruit or a mixture of exposed fresh fruits, comprising:
    cut pieces of fruit; and
    an edible gel coating exposed surfaces of the fruit, the coating comprising an anti-oxidant to retard browning, the gel coating having sufficient acid constituents to establish and maintain on the exposed surfaces of the fruit a pH below 3.

11. A method for preserving exposed fresh fruit, the method comprising:
    applying an edible gel coating to exposed surfaces of cut fresh fruit;
    applying to the gel coating a firming agent and a food grade antioxidant such that the gel coating adheres evenly to exposed surfaces of cut fresh fruit and establishes and maintains a pH below 3 on the surfaces; and
    storing the coated exposed fruit in a semi-permeable package such that the atmosphere around the fruit contains at least 2% oxygen.

12. The method according to claim 11, wherein the firming agent comprises calcium chloride and the antioxidant comprises at least one of ascorbic acid and L-cysteine.

13. The method according to claim 11, wherein providing the coating further comprises providing a food grade acidulant.

* * * * *